United States Patent
Rouse et al.

(10) Patent No.: US 8,200,260 B2
(45) Date of Patent: Jun. 12, 2012

(54) SYSTEMS AND METHODS FOR PROCESSING PURCHASE TRANSACTIONS BETWEEN MOBILE PHONES

(75) Inventors: Alan Rouse, Lawrenceville, GA (US); Charles Dasher, Lawrenceville, GA (US)

(73) Assignee: Ericsson Television, Inc., Duluth, GA (US)

( * ) Notice: Subject to any disclaimer, the term of this patent is extended or adjusted under 35 U.S.C. 154(b) by 431 days.

(21) Appl. No.: 12/539,192

(22) Filed: Aug. 11, 2009

(65) Prior Publication Data

US 2011/0039585 A1 Feb. 17, 2011

(51) Int. Cl.
*H04W 4/00* (2009.01)
*G06Q 30/00* (2006.01)

(52) U.S. Cl. ............... 455/466; 455/418; 455/414.1; 705/14.23; 709/206

(58) Field of Classification Search ............ 455/466, 455/418, 414.1; 705/64, 75, 24, 39, 14.23, 705/14.34, 14.51, 331, 340, 26.1
See application file for complete search history.

(56) References Cited

U.S. PATENT DOCUMENTS

| | | | |
|---|---|---|---|
| 7,434,723 B1 | 10/2008 | White et al. | |
| 7,461,010 B2 | 12/2008 | Kwan | |
| 7,494,067 B1 | 2/2009 | Zhu | |
| 7,849,020 B2 * | 12/2010 | Johnson | 705/64 |
| 2001/0029482 A1 * | 10/2001 | Tealdi et al. | 705/38 |
| 2002/0194138 A1 * | 12/2002 | Dominguez et al. | 705/64 |
| 2003/0093334 A1 * | 5/2003 | Barzilay | 705/26 |
| 2004/0083166 A1 * | 4/2004 | Pailles | 705/40 |
| 2004/0139032 A1 * | 7/2004 | Rowan | 705/80 |
| 2005/0154643 A1 * | 7/2005 | Doan et al. | 705/26 |
| 2005/0165697 A1 * | 7/2005 | Anvekar et al. | 705/65 |
| 2006/0116892 A1 | 6/2006 | Grimes et al. | |
| 2006/0258397 A1 * | 11/2006 | Kaplan et al. | 455/556.1 |
| 2006/0265339 A1 * | 11/2006 | Vakil et al. | 705/76 |
| 2007/0078751 A1 * | 4/2007 | Craig | 705/37 |
| 2007/0288392 A1 * | 12/2007 | Peng et al. | 705/72 |
| 2008/0189186 A1 * | 8/2008 | Choi et al. | 705/26 |
| 2009/0055319 A1 | 2/2009 | Raheman | |
| 2009/0254485 A1 * | 10/2009 | Baentsch et al. | 705/71 |
| 2010/0121768 A1 * | 5/2010 | Nambiar et al. | 705/80 |
| 2010/0185544 A1 * | 7/2010 | Adiseshann | 705/44 |
| 2010/0222038 A1 * | 9/2010 | Dragt | 455/414.1 |
| 2010/0235230 A1 * | 9/2010 | Ku | 705/14.23 |

\* cited by examiner

*Primary Examiner* — Kamran Afshar
*Assistant Examiner* — Mong-Thuy Tran

(57) ABSTRACT

In one embodiment, a transaction server facilitates a purchase transaction for goods or services between users at two mobile phones. The Purchaser initiates a request for a purchase transaction to a server, and is provided with a unique code ("purchasing nonce") that is uniquely associated with the request. The user of the first mobile phone provides the purchasing nonce to the Seller, who enters that value into the selling mobile phone. The selling mobile phone initiates a request to join the transaction as identified by the purchasing nonce. After confirmation of the Purchaser that the Seller can join the transaction, the Seller can itemize the goods for sale, which are electronically presented to the Purchaser for approval. After all items are selected, the Purchaser approves the transaction, and the transaction server can then transfers funds. An electronic receipt is provided to the Purchaser's mobile phone for confirmation.

20 Claims, 8 Drawing Sheets

SYSTEMS AND METHODS FOR PROCESSING PURCHASE TRANSACTIONS BETWEEN MOBILE PHONES

FIELD OF THE INVENTION

This invention generally pertains to generating and managing electronic messaging associated with a purchase transaction between two mobile phones.

BACKGROUND OF THE INVENTION

Facilitating electronic wireless transactions involving mobile devices provides a high level of convenience, both for a Purchaser and Seller. Both parties desire to incorporate a process that is easy to use and complements the existing purchase process when individuals deal in a face-to-face manner. However, both parties are also desirous of completing such transactions in a secure manner and with minimal potential for fraud.

To date, many proposals for using mobile devices to facilitate purchase transactions are based on a remote Purchaser (i.e., one that does not interact in person with the Seller). Such schemes require access to a Seller's web site and require use of special wireless protocols and device capabilities (such as a mobile web browser) that can be difficult and time consuming to use. If the scheme does allow using mobile devices for in-person transactions, the scheme often adapts existing payment methods or purchasing paradigms by merely replacing one component with wireless technology. For example, using a mobile phone to transmit or process a credit card. However, such schemes do not typically afford the flexibility that is possible with mobile phonese and are still subject to security concerns. For example, many of these schemes require the Purchaser to transmit sensitive credit card information wirelessly, which can be received by unauthorized individuals, or require the Seller to have suitable equipment to read a credit card.

In one prior art system, such as disclosed in U.S. Pat. No. 7,461,010, the need for credit card accounts is obviated by allowing payments for the goods or service over a network by crediting and debiting telecommunication accounts belonging to the Seller and Purchaser respectively. Thus, neither the Purchaser nor Seller is required to use a credit card or debit card to effect a transaction. However, that system requires the Purchaser to access a web site for selecting an item to purchase. While this may be appropriate for a remote Purchaser purchasing an item, it is difficult for the Purchaser to use when buying goods in-person from the Seller. That is, a Purchaser buying a good or service from a Seller in a face-to-face transaction would find it tedious to use a mobile phone to access a web site to complete the transaction. Further, this presumes that the Seller has established a web-site, and that the Purchaser has a suitable wireless device. Even if this is presumed, completing the purchase transaction in this manner would be inconvenient and time consuming.

Another prior art system, disclosed in U.S. Pat. No. 7,434,723, discloses a mobile payment authorization system that can be used with mobile phones, but again relies on using credit cards and does not offer the full potential a combination of simplicity, convenience, and security for the Purchaser and the Seller.

BRIEF SUMMARY OF THE INVENTION

One embodiment of the present invention provides the ability for a Purchaser to request a purchase transaction from a centralized transaction server cooperating with a wireless service provider. The server coordinates the creating of the transaction based on a request from the Purchaser and manages a Seller's request to join the transaction. Once the transaction is ready for sub-transactions comprising indications of the various goods and/or services that are purchased, the server maintains a pending total of the transaction. Once the Purchaser has approved the pending transaction, the server affects a funds transfer, and then provides confirmation of the same to the Purchaser and the Seller.

Other embodiments of the invention are possible, and this embodiment should not limit the scope of the invention beyond the scope of the claims herein.

BRIEF DESCRIPTION OF THE SEVERAL VIEWS OF THE DRAWING(S)

Figure 3:
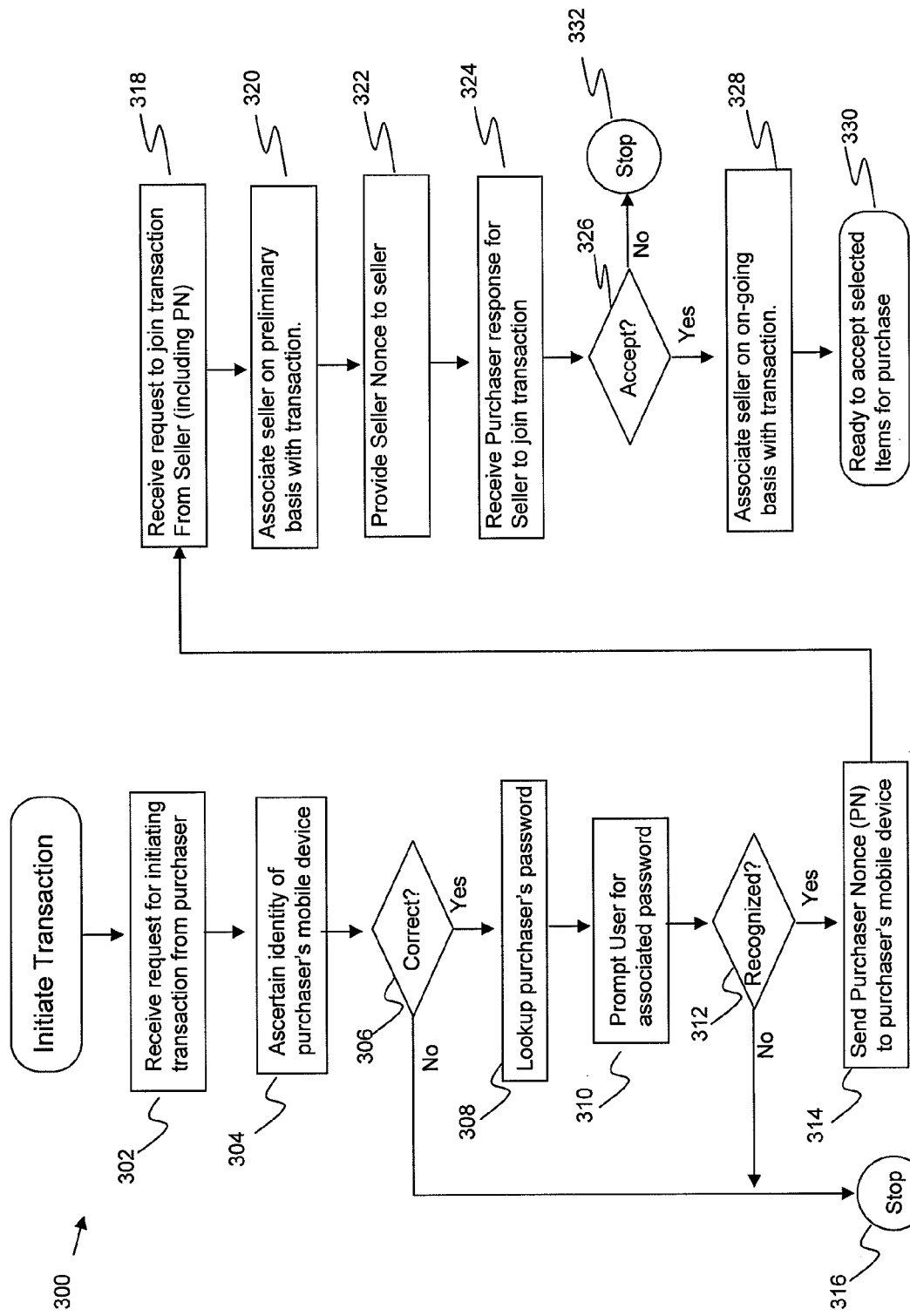

FIG. 3. illustrates one embodiment of the processing in a centralized transaction server associated with requesting a purchase transaction.

Figure 4:
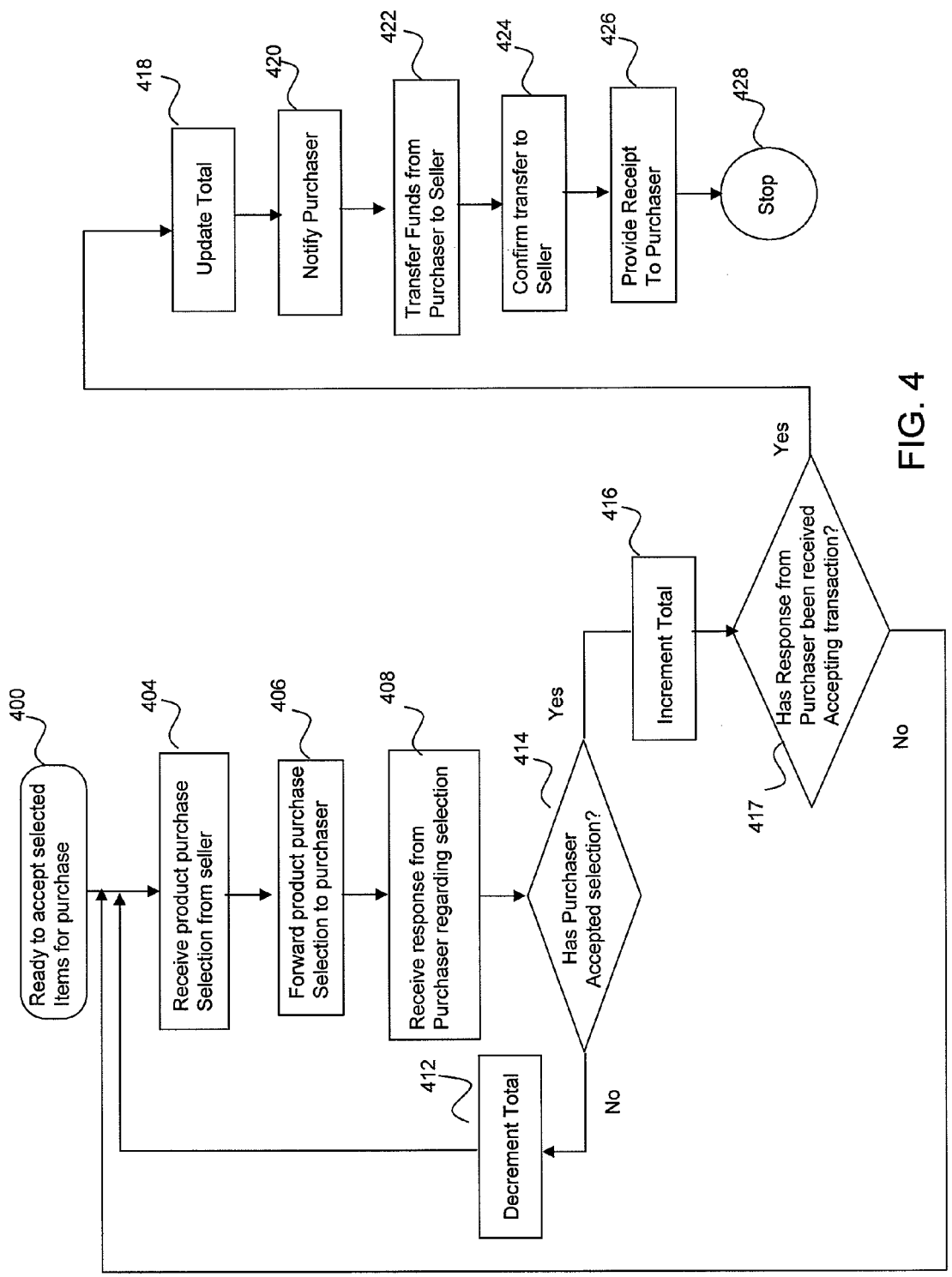

FIG. 4 illustrates one embodiment of the processing in a centralized transaction server associated with completing a purchase transaction.

Figure 5:
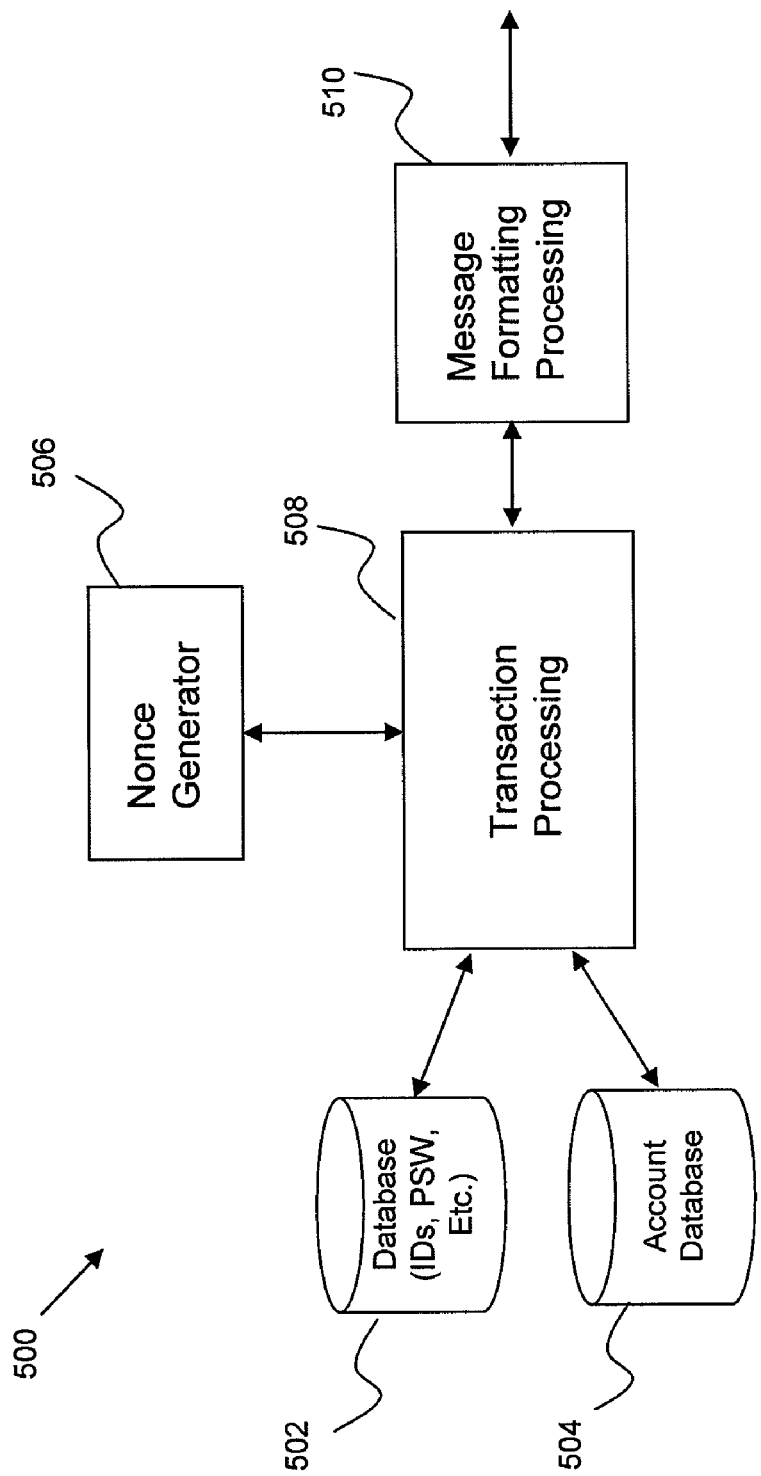

FIG. 5 illustrates one modular software architecture associated with an embodiment of the centralized transaction server.

Figure 6:
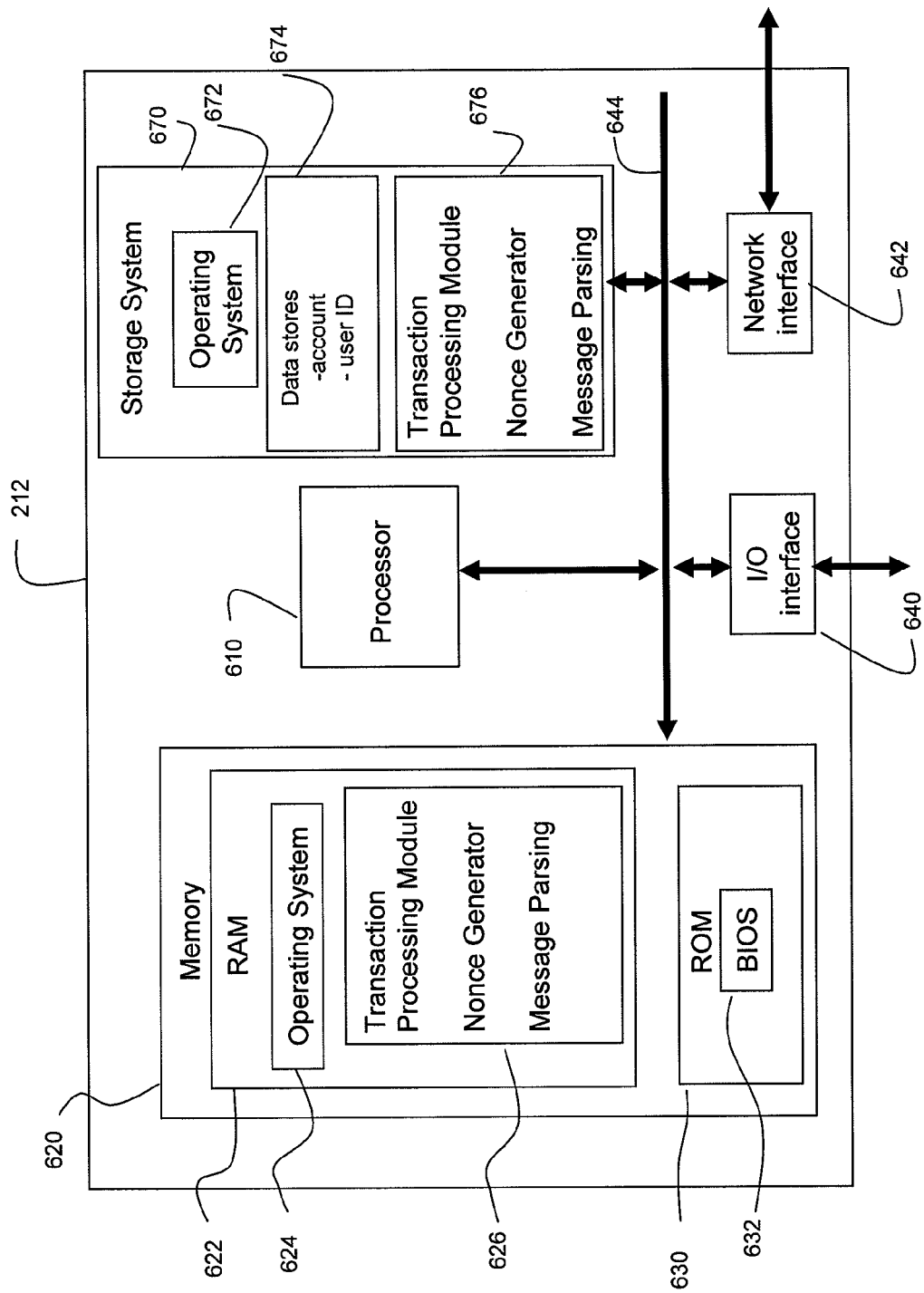

FIG. 6 illustrates one physical embodiment of the centralized transaction server.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the following descriptions and associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation unless otherwise indicated.

Although certain methods, apparatus, systems, and articles of manufacture have been described herein, the scope of coverage of this patent is not limited thereto. To the contrary, this patent at least covers various apparatus, systems, and articles of manufacture fairly falling within the scope of the appended claims either literally or under the doctrine of equivalents.

As should be appreciated, the embodiments may be implemented in various ways, including as methods, apparatus, systems, or computer program products. Accordingly, the embodiments may take the form of an entirely hardware embodiment or an embodiment in which computing hardware, such as a processor or other special purpose devices, is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

The embodiments are described below with reference to block diagrams and flowchart illustrations of methods performed using computer hardware, apparatus, systems, and computer-readable program products. It should be understood that each block of the block diagrams and flowchart illustrations, respectively, may be implemented in part by computer-readable program instructions, e.g., as logical steps or operations executing on a processor in a computing system or other computing hardware components. These computer-readable program instructions are loaded onto a computer, such as a special purpose computer or other programmable data processing apparatus, to produce a specifically-configured machine, such that the instructions which execute on the computer or other programmable data processing apparatus implement the functions specified in the flowchart block or blocks.

As used herein, the term "Purchaser" or "Purchasing User" refers to the person purchasing or buying goods or services, and is the person operating the "Purchasing Device." The Purchasing Device is also referred to as the Purchasing Mobile Phone or other term as evident from the context. Correspondingly, the "Seller" is the person selling the goods and services, and operates the "Point-of-Sale" ("POS") device. The POS device can be a mobile device, or a stationary device (such as an electronic cash register), or a stationary device having wireless access capabilities. In some instances the term "user" may be used to refer to either the Purchaser or Seller, and the intent is clear from the context.

Although the embodiments are illustrated herein as involving a wireless service provider providing a "short messaging service" ("SMS") in the form of a GSM wireless service provider, the present invention encompasses wireless service providers offering voice, data, and other well known cellular services, such as instant messaging, Internet access, email, etc. The present invention can operation using various technologies, including so called "3G" (third generation) or 4G (fourth generation) wireless access technology, CDMA, or other technologies. However, the GSM suite of capabilities with SMS provides a well known based of technology that can be used to illustrate one embodiment of the invention.

Further, although one embodiment is illustrated using a mobile device utilizing SMS capabilities and displays certain information, the service can be used on a variety of devices, and does not require any particular type of service for displaying data, as illustrated in the examples herein. For example, the service can function using SMS, IM, or other types of wireless data communication capabilities. In some embodiments, even a voice-based service can be used. However, it is preferred that the mobile device have a display of some sort, and such capabilities are usually found in mobile phones. It is not required that the display be relatively larger or very sophisticated, nor that the device have fully QWERTY style keyboard.

Service Overview Description

In prior art systems, a user interacting with a Seller may select an item on display for purchase, and hand the item to the merchant for completing the purchase. In many cases, the Purchaser also physically transfers a credit or debit card to the Seller for processing, and the Seller initiates a transaction based on the credit/debit card. In many prior art systems, to avoid the Purchaser handing over a credit card to the Seller, the Purchaser can "swipe" the credit or debit card through a reader. Some prior art systems allow wireless transfer of the credit card information to a reader without even having to contact the card with the card reader. However, in each of these prior art examples, once the Seller has knowledge of the credit card number, it is essentially the Seller that initiates the electronic transaction messaging with any electronic transaction server. Further, in some instances it is not until the transaction is completed that the Purchaser is then presented with a receipt and is then able to see the itemized charges for the various items. At this point, if there is a dispute regarding an item price, the Purchaser must request another transaction to refund the charge, and the process must be redone with the Seller again initiating a transaction.

Unlike the prior art, in one embodiment disclosed herein, the Purchaser initiates the electronic transaction messaging with a transaction server. The Purchaser is able to review and potentially accept each item sub-transaction using their mobile device. Each item selected for purchase is referred to as a sub-transaction, and in one embodiment, information is presented for display on the Purchaser's mobile phone for each sub-transaction. The Purchaser is aware of each item and its price charged, so that corrections can be easily made. If everything is acceptable, the Purchaser can accept the overall transaction. The transaction server allocates the funds and provides a confirmation to the Seller and Purchaser.

In one embodiment of the present invention, it is necessary for the Purchaser to obtain some type of wireless messaging service with the service provider, which typically is a cellular service provider. The messaging is used to implement a "purchase transaction" service offered by the wireless service provider. Typically, the purchase transaction service is an option provided to the Purchaser, and is a distinct capability added to the Purchaser's basic mobile service. However, in other embodiments this can be part of the basic service provided to the subscriber, or a service obtained from a third party provider. Further, in the embodiment described, the Seller typically also has a messaging service with the service provider, and may also subscribe to the "purchase transaction" service. In other embodiments, the Seller and Purchaser can be subscribers of different wireless service providers. As used herein, the term "system" describes the various components used by the service provider to provide the transaction service.

The system provides a Purchaser the ability to request a purchase transaction. A "purchase transaction" is a set of steps involving the Purchaser's Device, the POS device operated by the Seller (or simply, the Seller's mobile phone), and a central transaction server ("CTS"). As it evident, the purchase transaction service provides the capability of the Purchaser to easily and securely pay the Seller for buying certain goods and provides a record of the transaction. For convenience, the Purchaser is described herein as purchasing "items," and this term is intended to encompass purchasing either goods or services.

The service (e.g., the purchase transaction service) is invoked by the Purchaser by explicitly requesting a purchase transaction. This results in the system determining and providing the Purchaser's mobile device with a unique transaction identifier, which the system associates with this particular purchase transaction. In one embodiment, the transaction identifier is sent using a SMS message so that it is viewable by the Purchaser on the Purchaser's phone display, and the Purchaser verbally communicates this value to the Seller. The Seller, in turn, initiates a request to "join" the transaction, which is accomplished by the POS device providing the transaction identifier to the system. By virtue of the POS device providing the transaction identifier, the system is able to determine which purchase transaction (from various potential requests) the Seller has requested to join. In one embodiment, the system provides a different transaction identifier to the Seller, which can be conveyed to the Purchaser via another SMS message. This is also provided to the Purchaser via an SMS message. Thus, the Purchaser and Seller can verbally convey this second transaction identifier so that each party is confident that they are dealing electronically with the same individual that they are dealing with in person. The system links these two identifiers together if the Purchaser agrees to accepting the Seller into the transaction. If the Purchaser rejects the Seller's request to join the transaction, the Purchaser indicates such, and the system informs the Seller and the Purchaser that the transaction has been cancelled For convenience, the first transaction identifier is called the Purchaser's transaction identifier and the second is called the Seller's transaction identifier.

Once the transaction has been established by the Purchaser and the Seller has joined the transaction, individual sub-transactions for the sale of one or more goods can occur. Each sub-transaction involves the Seller's POS device sending a message to the system identifying the good, its quantity, and its price, and sub-total. This information is relayed to the Purchaser's mobile device using the SMS capability so that the Purchaser can review the sub-transaction. In this way, each item being purchased and its price is viewed by the Purchaser. In some embodiments, the Purchaser can, or must, explicitly approve each sub-transaction.

Once the sub-transactions are completed, the Purchaser can approve the transaction, and this initiates the funds transfer to the Seller. Once completed, the confirmation of funds transfer is provided to the Seller and the Purchaser. When providing confirmation to the Purchaser, this can be accomplished by providing an electronic "receipt" to the Purchaser. In this manner, both the Seller and Purchaser know that the payment has been tendered, and the goods can be exchanged or the services provided.

Figure 1A:
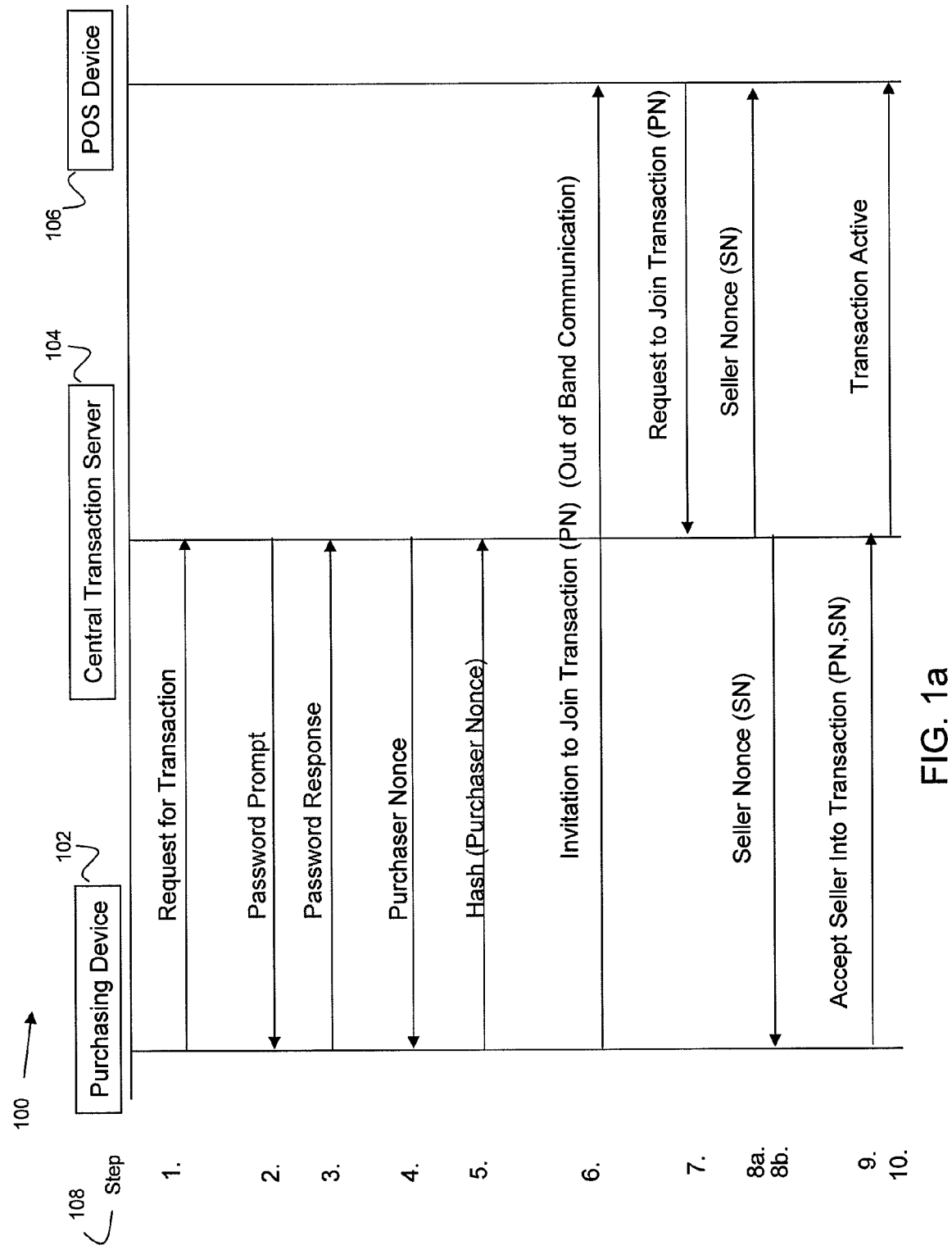
FIGS. 1a-1c illustrate one embodiment of various message flows associated with one embodiment of the invention.

A detailed overview of the messaging process associated with the service is provided in FIG. 1. In FIG. 1, the overall process 100 is shown by a line diagram representing messages exchange between entities over time. In FIG. 1a, the Purchasing Device 102 communicates with a Central Transaction Server 104, which in turn communications with the POS Device 106. Reference will be made to the "step number" which is shown on the left column.

The process begins in Step 1 with the purchasing device 102 sending a "Request for Transaction" message to the Central Transaction Server which invokes the purchase transaction service. The request includes identification data of the device, which in many embodiments is a mobile telephone number associated with the Purchaser's cellular phone. In other embodiments, such as in GSM, an IMSI (international mobile station identifier) may be sent. In other embodiments, a serial number or other identifier is sent to the service provider. The service provider is able to identify the mobile phone and associate a service profile using techniques well known in the art.

In some embodiments, the next steps may be Step 2 and Step 3. These steps are optional, and are designed to ensure that the user using the purchase device is an authorized user. Specifically, this ensures that someone else has not picked up the mobile device and is surreptitiously using it to illicitly purchase goods. In other embodiments, other techniques could be used, such as fingerprint verification incorporated into the phone, voice analysis incorporated in the service provider, etc. In this embodiment, the user is prompted to enter a password. The prompt is provided in Step 2, and is typically displayed on a display of the Purchaser's device. The password is provided by the Purchaser, typically by keying the appropriate keys on the mobile device, and the response is sent to the Central Transaction Server 104 in Step 3. Assuming that the user has entered the proper response, the user is assumed to be authorized and the next step can occur.

In Step 4, a "purchaser nonce" ("PN") is sent to the Purchaser's device. In the context of security engineering, a "nonce" is information, typically an alphanumeric sequence that is used once. Typically, it is based on a pseudo-random number with a time varying aspect, so that numbers are not repeated, or infrequently repeated. In one embodiment, this is a number having 3-5 alphanumeric characters. Thus, the aforementioned Purchaser's Transaction Identifier can be embodied by the purchaser nonce. The PN is typically displayed to the Purchaser.

In some embodiments, an additional security step may occur in Step 5. Recall that the above messaging involved the device sending its identification to the service provider, and the user providing their password to the service provider. Both of these pieces of information are sent over the air, and it is possible that a malicious user could read and copy this information to clone a phone to mimic the Purchaser's device. The malicious user could then impersonate the Purchaser by entering their password. To combat this, any of the well known "challenge-response" authentication protocols can be used to accomplish this. In one embodiment, the Purchaser's mobile device may in Step 5 return a value defined by a hash function using the purchaser's nonce. The hash function uses the nonce value as a seed and the function generates a value according to a defined algorithm. The Central Transaction Server knows what hash function is used the mobile device uses, and hence expects a certain expected value. The hash function is typically downloaded to the purchasing device when the user signs up for the service, and is stored in memory of the device. This protects the Purchaser against "cloned" mobile devices. While it may be possible for others to capture the mobile telephone number, serial number transmitted, and password from the Purchaser's device, the algorithm used would not be known. As previous noted, a number of well known challenge-response algorithms could be incorporated to detect against such possibilities. It should be recognized that other security schemes can be used to determine the user is authorized and/or to authenticate the mobile device, such as using various security techniques. Thus, other embodiments can use other messages and functions to accomplish the necessary level of security.

Assuming that the mobile device has been identified, the user is authorized, and the mobile device has been verified, the Purchaser can now provide the nonce value to the Seller. This communication is done out-of-band, typically by the Purchaser verbally informing the Seller. In other embodiments, a wireless protocol between the Purchaser's device and the POS can be used. In the case of the former, the Seller enters the PN value into the POS device, whereas in the latter, it is processed directly by the POS device without the Seller entering it. However, if a wireless protocol is used to convey the PN from the Purchaser's mobile device to the Seller's device, it is typically a very low power unlicensed protocol mechanism since it is the Purchaser's intent to only have one Seller join the transaction, and not nearby other Sellers.

The provision of the PN in step 6 to the POS device can be construed as an invitation for the Seller to "join" the transaction; in effect to involve the Seller in the transaction. The POS uses the PN to initiate a request to join the transaction in Step 7. Because the POS device provides its corresponding identification information (such as mobile number, IMSI, and/or serial number), the Central Transaction Server knows who is attempting to joint the transaction, and the PN identifies which one of several potential pending transactions the Seller is requesting to join.

In Step 8, the Central Transaction Server provides another nonce, called the "Sellers Nonce" ("SN") to the Purchaser's device and the POS. This corresponds to the Seller's Transaction Identifier previously disclosed. The Seller can verbally communicate the SN to the Purchaser, where the Purchaser can compare it with the number presented on the Purchaser's phone. The SN allows the Purchaser to accept the Seller into the transaction in Step 9, and in Step 10, the CTS confirms to the POS that the Purchaser has accepted the Seller. At this point, the transaction can be considered "Active." At this point, the Purchaser and Seller have been identified to each other, and there is a high level of confidence that each is dealing electronically with the correct entity. They are ready to transact business.

Figure 1B:
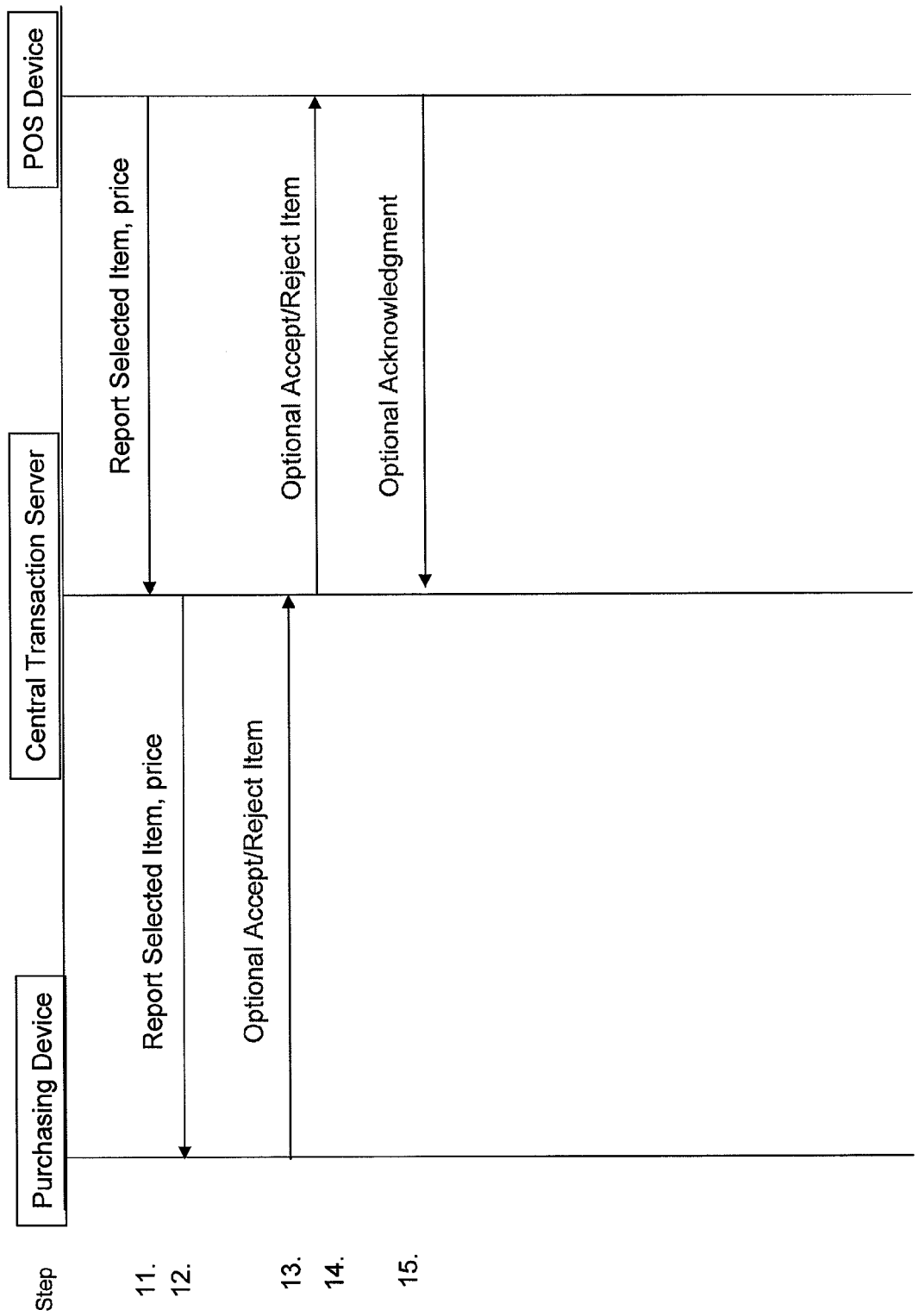

The next stage comprises one or more sub-transaction steps involving purchasing a good(s). This is illustrated in FIG. 1b in Steps 11-15. In Step 11, the Seller typically processes the item to be purchased, such as by "scanning" a bar code on the item using a bar-code reader or otherwise entering data into the POS device. The POS device could be the Seller's mobile phone, and the entry comprises the Seller entering text via mobile device as a SMS message to the CTS server. Thus, in some embodiments, the POS device could involve an application program that facilitates data entry by interfacing with a bar code scanner, RFID tag reader, or a touch screen display that would generate/receive the messages to the CTS server. The result is that the POS device sends a message ("Report Selected Item, price") in Step 11 which indicates the item being purchased and its price. In other embodiments, a quantity indicator may also be sent with a sub-total. In other embodiments, a total price, including any additional taxes can be tallied and sent to the CTS. In Step 12, the same information is conveyed from the CTS to the Purchaser's device. In this manner, the user is presented with information confirming the price for the goods purchased and the total prices for the transaction. The item is not considered purchased at this time, because as it will be seen, the Purchaser can reject the item or the overall transaction. In one embodiment, SMS messages are used such that the message contents are processed by the purchasing device and displayed to the Purchaser. In this manner, the Purchaser can see the particular items and prices that the Seller has indicated.

Step 13 represents a step that is optional in certain embodiments. Namely, that the Purchaser after viewing the item and price indicated can opt to accept or reject the item. If rejected, the CTS can confirm this to the Purchaser and Seller by sending an appropriate message (not shown) rejecting the item. However, assuming the Purchaser accepts the sub-transaction, a message is sent in Step 13 to the CTS and the CTS relays this information to the POS device in Step 14, and the POS may acknowledge receipt of the acceptance/rejection in Step 15. In some embodiments, the requirement that the Purchaser accept or reject a purchase item may not be required, as it can result in a time consuming interaction between the Purchaser and the system during a transaction. The process shown in FIG. 1b can be repeated as many times as appropriate for each item being purchased.

Figure 1C:
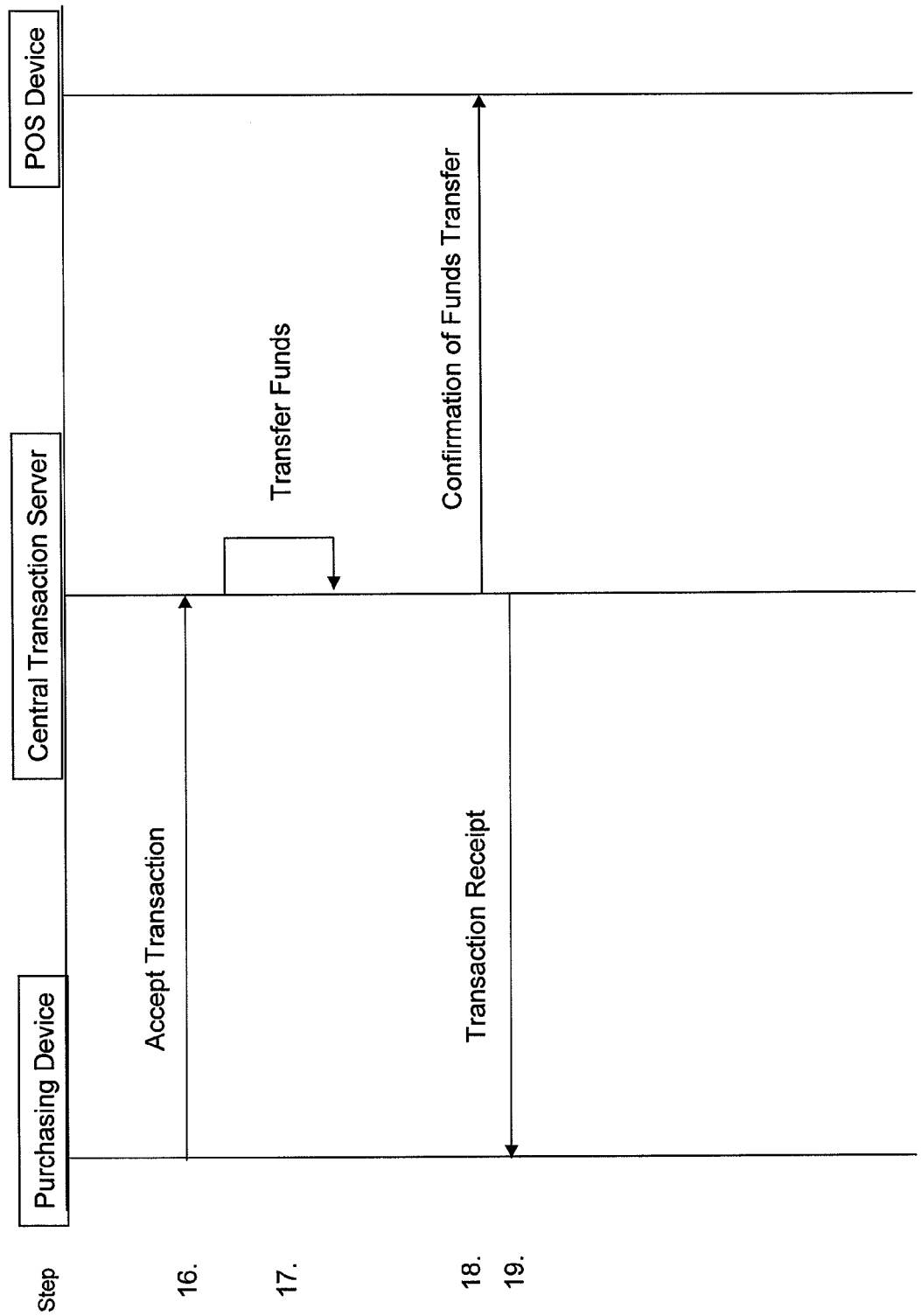

Once all the items have been indicated, the transaction can be accepted and the funds transfer can occur. This is shown in FIG. 1c, and involves Steps 16-19. In Step 16, the Purchaser causes the Purchaser's device to send an "Accept Transaction" message to the CTS. In other embodiment, the CTS server may respond by sending a total amount due and a confirmation that the Purchaser accepts the transaction. If the Purchaser rejects the transaction, the CTS server sends a corresponding "Transaction Cancelled" message to the Purchaser and Seller.

Assuming the Purchaser has accepted the transaction, the CTS server responds in Step 17 to affect the transfer of funds, or crediting/debiting of accounts. Once successfully completed, the CTS then transmits a "Confirmation of Funds Transfer" message in Step 18, and a "Transaction Receipt" message in Step 19 to the Purchasing Device. The Transaction Receipt can be itemized or provide a total in various embodiments. Further, the CTS typically retains a log of transaction for future reference either by the Seller or Purchaser, thus providing a way for either party to conveniently reference past transactions.

In the above embodiment, the names, format, and function of the above messages can be varied. Various other messages can be incorporated without detracting from the purpose of the system. In other embodiments, other forms of communication can be used, including email or voice. For example, the Purchaser and Seller could access an interactive voice response system. The Purchaser could dial a number associated with the Purchase Transaction Service and receive a prompt for their password, and respond using voice or keypad entry. The CTS could respond by verbally indicating the PN. Then, the Seller could dial the same number, and provide the PN via an IVR application, which connects the Seller to the transaction. Thereafter, one skilled in the art could readily define the corresponding prompts and types of responses for completing the Purchaser transactions. The Seller could verbally indicate the name of the good sold, and enter via their keypad the quantity and price when prompted.

Deployment Architecture

Figure 2:
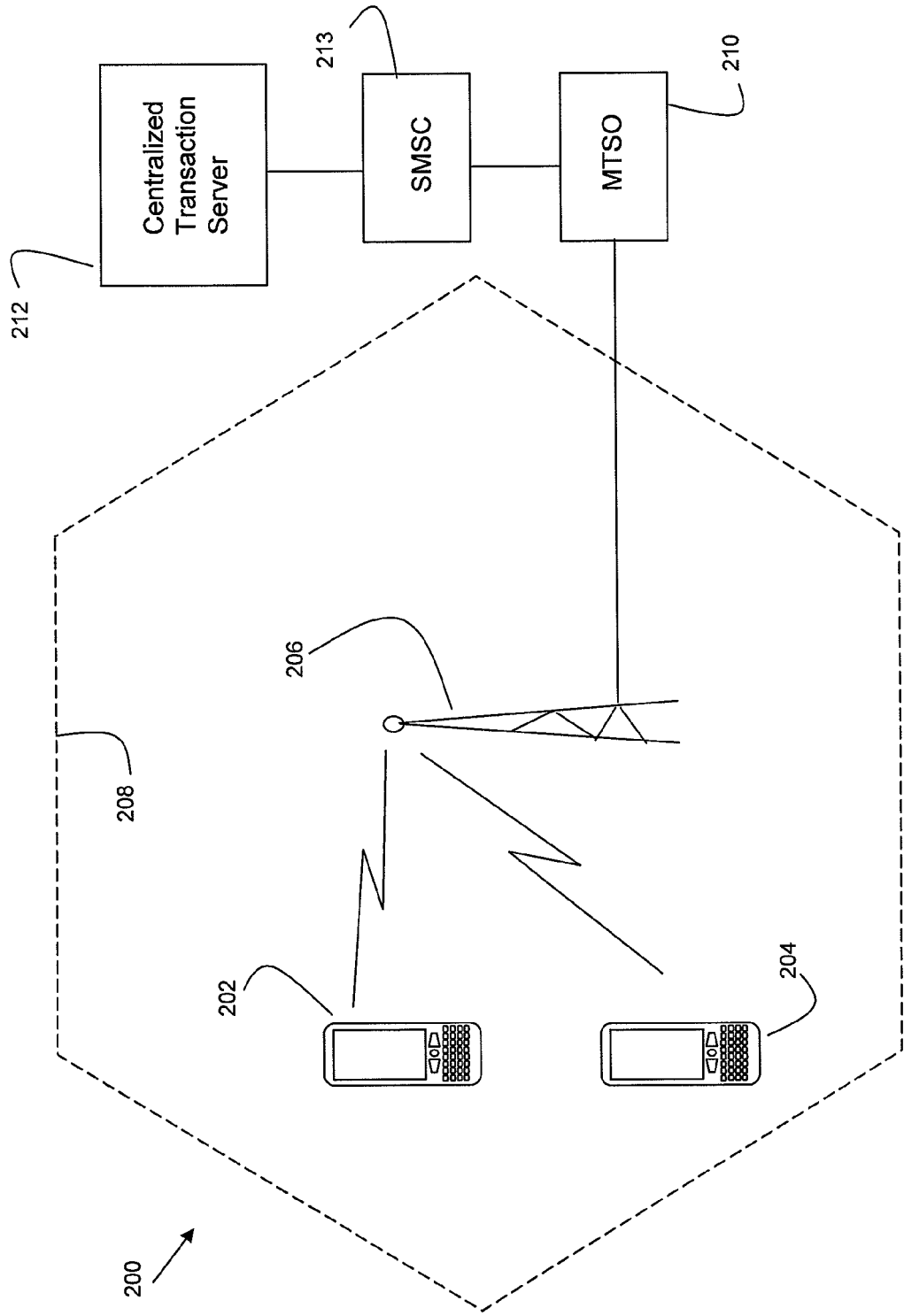
FIG. 2 illustrates one embodiment of system architecture for the present invention.

Once deployment of the service is shown in system 200 of FIG. 2. In FIG. 2, the cellular service provider provides wireless service using a mobile telephone switching office ("MTSO") 210 which is connected to one or more antenna 206, or cellular towers. Other embodiments may incorporate additional components. The cell tower serves a geographical area 208, which is shown as a hexagon for convenience, but which shape actually varies based on a number of factors. The Purchaser 202 is represented by a mobile device which in this embodiment is shown as a phone with a display, as is the Seller's device 204. The MTSO 210 communicates over a network or other private facilities with a Short Message Service Center ("SMSC") 213 which processes the SMS messages. One embodiment of the present invention uses SMS messages which are a capability associated with the GSM wireless standard well known in the art that allows short text messages (up to 160 characters) to be rapidly communicated between entities. The SMSC can interface with other computer systems, and the SMSC 213 interfaces with a centralized transaction server 212. The interface between the SMSC and the CTS can occur using any of the well known protocols and methods. Such arrangements for allowing a computing system to send/receive SMS messages are well known to those skilled in the art. The CTS 212 typically comprises various components which use existing infrastructure for communicating with the Purchaser and the Seller, and the CTS 212 manages the transaction with the mobile devices. In some embodiments, the CTS may also manage the funds accounting, whereas in other embodiments, the CTS may interact with a third party payment processor (not shown) which performs the funds accounting.

It is possible for the Purchaser and Seller to obtain service in a common area from two separate cellular service providers. In this case, the two cellular service providers communicate between each other in established techniques, so that the Purchaser and Seller can transparently communicate with each other. Thus, transmitting SMS messages or other types of communication between two service provider involving two subscribers are well known and are not repeated herein.

Transaction Processing Flow

The transaction processing flow refers to the series of steps that are performed by the CTS in carrying out the service. This is accomplishing by a computer processor executing instructions stored in a computer readable media. These steps can be divided into 1) requesting a transaction, 2) executing the sub-transactions, and 3) finalizing the transaction.

The steps 300 are shown in FIG. 3 for initiating a purchase transaction by first receiving in step 302 a request for a purchase transaction from the Purchaser. The CTS is provided information from the wireless service provider regarding the identity of the mobile device making the request, and this information is delivered to the CTS, where in step 304 the CTS ascertains the identity of the Purchaser's mobile device, and hence the Purchaser. If this is not recognized in step 306, then the processing stops in step 316. Assuming the Purchaser is recognized, the optional password verification process is then performed. In step 308 the Purchaser's password is retrieved and the Purchaser is prompted in step 310 to provide this information, which is received by the CTS. If the CTS is not able to match up the password for that user in step 312, then the transaction is halted in step 316. Assuming the password is recognized, then the CTS provides the purchaser's nonce (PN) to the purchaser's mobile device, typically using a SMS message, but other techniques can be used.

At this point, the Purchaser may verbally communicate the PN to the Seller, and the Seller will initiate a request to join the transaction identified by the PN in step 318. Presuming that the PN entered by the Seller is correct, the CTS then associates the Seller with the transaction in step 320. Essentially, the Seller is "joined in" the transaction. The CTS may respond by providing a Seller's nonce (SN) to the Seller and Purchaser in step 322. The Seller can verbally communicate this to the Purchaser, who can readily compare this value with the value received to ensure that the appropriate Seller has joined the transactions.

In step 324 the Purchaser accepts or declines the request for the Seller to join the transaction by sending a response to the CTS. If the CTS is step 326 determines the Purchaser has refused, the transaction is terminated in step 332. If accepted, then the CTS associates the Seller with the Purchaser in the transaction, and is ready in step 330 to receive indications from the Seller for selected goods. The transaction can now enter the sub-transaction phase.

In FIG. 4, the process for accepted selected items for purchase 400 is shown. The process can be shown in different ways, and FIG. 4 illustrates one embodiment. The first step 402 involves the CTS receiving a purchase selection in step 404. This is a message from the Seller indicating an item, its price, and potentially a quantity, sub-total. In other embodiments, this can also include any tax amounts. The CTS in step 406 sends a message to the Purchaser indicating this information. The CTS also maintains a record of the sub-transaction, so that the CTS knows the current subtotal of the goods purchased. In step 408, the CTS receives a response from the Purchaser accepting or rejecting the sub-transaction, and in step 414, if rejected, then the subtotal is decremented and that sub-transaction is erased from the transaction being recorded in the CTS. The CTS then awaits the next input from the Seller in step 404. This flow represents the Purchaser initially selecting a good, the Seller entering it for sale, and then the Purchaser changes their mind. If the Purchaser accepts the item, then in step 416 the subtotal of the transaction is increased to reflect the sub-transaction.

At any time the Purchaser can accept the overall transaction. Typically, this is done after the last item has been indicated by the Seller and accepted by the Purchaser. This can be prompted by the CTS after each sub-transaction, or merely indicated as desired by the Purchaser (such as sending a message "Transaction Accepted" to the CTS). Thus, the CTS in step 417 determines whether the Purchaser has indicated a "Transaction Accepted" message. If none has been sent/received, then the CTS waits for further additional product indications sent by the Seller in step 404. Otherwise, the sub-transactions are completed, and the next phase, finalizing the transaction can proceed.

The steps associated with finalizing the transaction begin with step 418, which shows computing the total, which may include taxes, service fees, etc., and then informing the Purchaser in step 420. In some embodiments, a confirmation prompt may be provided to the Purchaser requesting confirmation to proceed. In step 422, the CTS performs the necessary steps to transfer the funds, which depends on the type of account established, whether a third party processor is involved, etc. Once the funds transfer has been completed, then in step 424 the CTS sends a confirmation of the transfer and the total amount to the Seller, and an electronic receipt in step 426 to the Purchaser, which also indicates the total debited for the Purchaser. In some embodiments, this may provide a break down of service fees, taxes, shipping costs, etc. These details are logged by the CTS for future reference, and the transaction completes in step 428.

Modular Software Architecture

In one embodiment of the present invention, a computing system comprising a central transaction server executes instructions for performing a purchase transaction. In one embodiment, these instructions may be defined in various program modules, and one such functional arrangement of the program modules is shown in FIG. 5. In FIG. 5, the modular architecture 500 is shown as a main transaction processing module 508 that receives and processes requests from Purchasers and Sellers, and determines and transmits the appropriate responses. This application module 508 interacts with a user database 502, which stores various user related data, such as user identification information, password, equipment serial number, etc. Thus, any security related information for the Purchaser can be stored in this database. The other database is an account database 504, which maintains the appropriate status of funds associated with purchase transactions. This may be common to a number of different Purchasers Although other embodiments may combine the two databases into one database or have other logical configurations.

The transaction processing module also accesses a separate nonce generator, which generates the unique transaction identifiers associated with each transaction created by the system. This can be based on a pseudo random number that has a time-varying component to avoid duplication or other techniques known in the art. The nonce value is provided to the transaction processing module 508 as required. Finally the transaction processing module 508 communicates with a message formatting processing module which parses incoming messages according to the desired message format, and ensures that the syntax is correct. This also formats the outgoing messages as required In processing the messages, it is not necessary for the CTS to recognize the contents of any text describing the goods being sold, but it is necessary for the CTS to recognize the charges (including sub-total) of the goods being sold. Thus, if the CTS is informed that two widgets are sold in a sub-transaction at $5.00 each, it is not necessary for the CTS to know what a "widget" is, but only that two at $5.00 each, for a total of $10.00, have been defined in a sub-transaction. Thus, the description of the item can be considered a user-defined text field, which does not have to be recognized by the CTS. However, since the Purchaser will likely have the contents of the description field presented on their mobile display, the text should be recognized by the Purchaser.

Those skilled in the art will recognized that a variety of messaging protocols can be defined or adapted for conveying the information shown in FIGS. 1a-1c, and hence specific message formats are not necessary to be illustrated.

Centralized Transaction Server Architecture

One embodiment of the centralized transaction server 212 is shown in FIG. 6. In FIG. 6, the CTS 212 comprises a computing system, which can be a single processor or multiple processor computing system. FIG. 6 illustrates a single processor 610, which communicates over an internal bus 644 to a storage system 670, a memory system 620, other devices via an input/output interface 640, or to external communication networks such as a management terminal or administrator's I/O device using a network interface 642. The storage system 670 can comprise any well known long term or secondary storage mediums, such as disk drives, CD drives, tape drives, or the like. The storage system 670 can comprises a number of devices, and typically stores a copy of the operating system 672, which controls the computer and data stores 674, which stores the accounting funds, user identification information, etc. The storage system 670 also maintains a long term copy of the application program modules 676, which comprises the transaction processing module, the nonce generator, and the message formatting module. Other modules can be stored or access as well.

These application modules are copied in memory 620 as needed (such as when the system is booted up). Thus, the memory 620 comprises main memory in the form of RAM 622 which maintains copies of the operating system 624, the application program modules 626, which are executed by the processor. The memory further comprises ROM 630 which includes well known basic input/output service (BIOS) 632 modules.

Other embodiments using various other computing system architectures or system modules are possible, including well known server architectures or distributed processing techniques.

Funds Transfer

In FIG. 1c, step 17 illustrated the "transfer funds" processing step. This step can occur in various ways. In one approach, termed a "pre-paid" account, the Purchaser establishes an account with the service provider for use in purchase transactions, and pre-pays a desired amount into the account. This account could be the same account that the service provider uses for debiting the Purchaser for wireless services, or a separate account established by the user to be used for purchase transactions. In the pre-paid account, the total of the transaction which is maintained by the CTS is compared against the Purchaser's pre-paid account, and if there are sufficient funds in the pre-paid account, that amount is debited from the account. For example, a Purchaser can establish a $100 pre-paid account, and the CTS will accept one or more transactions totaling up to $100.

Alternatively, the Purchaser may have a "post-paid" account, where the transaction total is merely debited against the Purchaser's post-paid account. To the extent that a credit limit is not reached, multiple purchase transactions can be posted against this account, and the service provider issues a periodic invoice to the user, which reflects the added total of the purchase transaction. If a transaction exceeds a credit limit, the system may deny completion of that purchase transaction.

As for the Seller, the system must essentially simultaneously credit an account associated with the Seller. Upon debiting the Purchaser's account, the CTS credits the Seller's account for the amount of the transaction. The Seller may retain the credit in the Seller's account and may periodically obtain monetary funds from the service provider, or receive some other form of reimbursement from a third party.

In another embodiment, the CTS may keep a credit card or other account information which is used to issue a charge on behalf of the Purchaser from a third party, such as a bank or credit card processor. In this manner, the Seller can be compensated. In some embodiments, the CTS may then direct that funds are dispersed by a third party to the Seller's account. In this manner, the CTS is not actually incurring liabilities with the Seller, but acts as an agent with a third party (such as a bank). Those skilled in the art will appreciate that other financial arrangements are possible to affect a debit to the Purchaser, and a credit to the Seller, after the purchase transaction has been completed. The use of a credit card or bank account are only but one variation, and debit cards, third party payment processors, or other financial instruments or services are possible and well known for use in electronic purchase transactions.

The service provider is typically compensated for providing the transaction service, which can be a flat fee per transaction, or a percentage of the transaction total. This fee can be added as a separate amount for the transaction, or billed as part of the service provider's billing to the Purchaser. In other embodiments, the service provider can be compensated by a third party, such as the Seller, bank, etc. as a form of sales commission.

Mapping a "Request to Join Transaction" with Transaction Identifier

The transaction identifier is used to uniquely identify a transaction created in the transaction server. Once a request from a Purchaser to initiate a transaction occurs, the transaction must be joined by the Seller within a defined timeframe. The CTS creates a timer when the transaction identifier (e.g., purchaser's nonce) is allocated, and marks the transaction as being in a "waiting to be joined" state. If the Seller does not join the transaction (as indicated by providing the purchaser's nonce in a "Request to Join Transaction" message), the timer will expire and the CTS will terminate the pending transaction. A message may be sent to the Purchaser indicating that the transaction was not joined, and the CTS terminated any pending transaction. This timer value may be set based on various embodiments, and can be as little as a few seconds to several minutes or more.

The CTS server typically will have a number of transactions active at a given time and similarly may have a number of pending transactions waiting to be joined. The use of a larger transaction identifier number facilitates handling a larger number of pending transactions, and minimizes the possibility of joining an incorrect Seller to a transaction. However, the use of a larger transaction identifier does complicate the communication of the value from the Purchaser to the Seller (and vice versa). In one embodiment, to reduce the need for a larger number of digits, a transaction identifier is used that comprises five alphanumeric characters (number and upper/lower case letters) and thus can provide over 1.9 billion different combinations. In one embodiment, this value can also be displayed as a bar code on the Purchaser's mobile device, via application software on the device. The bar code can then be scanned by the merchant, using a well known scanning device. In embodiments where the Seller has a scanner to read the value displayed on the Purchaser's phone, the number of digits in the transaction identifier does not complicate the communication of the value to the Seller, as the scanner can readily read a larger number of digits.

However, in many embodiments, both the Seller may not have a scanner. If fewer digits are used in the transaction identifier, then this facilitates verbally communicating the value form the Purchaser to the Seller. The service provider may define domains to associate the transaction identifier with. This can aid in ensuring that Sellers are not joined to an incorrect pending transaction. In one embodiment, the domain is defined by the cell site (or portion of a cell site called a "sector" served by certain antennas). This presumes that the Purchaser and Seller are physically located in the vicinity of each other, and hence are served by the same cell sector. Thus, the transaction identifier assigned to a Purchaser and indicated by a Sellers can be further limited to those Purchasers and Sellers being served by the same antenna tower.

The transaction identifier typically has a limited life. That is, once the transaction identifier is created, the CTS creates a "pending" transaction and starts a timer. If the Seller does not join the transaction within a certain time period (and thereby move the transaction from a pending state to an active state), the "pending" transaction is cancelled.

However, in other embodiments, it may be desired to allow Purchasers to interact with remote Sellers, where the Purchaser and Seller are served by different cell sites. In this case, the transaction identification number typically cannot be limited to a single antenna sector.

Illustrative Application

A typical application can be illustrated as follows. An individual (the Purchaser) is walking through an outdoor market, such as a flea market, an outdoor produce stand, or vendor stalls established near a ballpark, etc. The vendors (Sellers) have various stands or booths established, and it is assumed that household power and telephone lines are not readily available to the vendors, as the venue is temporary in nature.

The Purchaser interacts with a Seller that displays various goods for sale, and decides to purchase two souvenirs. The Purchaser avoids carrying cash, and although the Purchaser may carry credit/debit cards, the Seller is presumed to not have the necessary wireless devices for reading credit/debit cards. However, both the Purchaser and the Seller have cell phones, and both devices are assumed for convenience of illustration to be mobile phones with a display, ability to receive messages (e.g., "SMS" capability), and capable of executing a downloadable application. Many such products are readily available, and can accommodate third party developed applications.

The Purchaser has an account with their service provider for facilitating purchase transactions as does the Seller. The Purchaser requests to initiate a purchase transaction by sending an electronic mail message to a CTS server associated with the service provider with a subject matter or contents indicating "requesting transaction identifier." In this embodiment, the Purchaser's phone has an application that facilitates invoking the function. The service provider responds by providing a transaction identifier in a response message. The message is processed by the Purchaser's device so as to display the Purchaser's transaction identifier number (e.g., purchaser's nonce). In other embodiments, the Purchaser's device can display the number in addition to a industry standardized bar code or other two dimensional graphical code.

The Purchaser has a limited time period, which can be a few minutes, to provide the Purchaser's nonce to the Seller and for Seller to indicate it to the system. The Purchaser provides the value to the Seller typically by verbally indicating the code, or showing the display to the Seller. The Seller in turn initiates a request to join the transaction by initiating a message that includes the transaction identifier. If the Seller indicates a transaction identifier that is not assigned, the CTS can provided a limited number of opportunities to re-enter the transaction identifier to the CTS before the CTS cancels the transaction. The system immediately informs the Purchaser of the request, and provides both the Purchaser and the Seller with a corresponding Seller's nonce (or Seller's transaction identifier). The Seller can verbally communicate the value to the Purchaser so that the Purchaser confirms that the correct Seller has joined the transaction. The Purchaser would then confirm to the service provider that the Seller has accepted, and that the transaction can proceed.

At this point, the Purchaser can hand or show the Seller the goods being purchased. The Seller then provides indications to the transaction server of the items being purchased, and the Purchaser can view these items, their cost, and the total cost on a display of their phone. In various embodiments, any additional taxes or fees can be indicated by the Seller, or computer by the CTS server.

When the Purchaser indicates that the transaction is acceptable, this is indicated by the Purchaser sending a message to the transaction server. At that point, no further items can be added by the Seller, and the system then proceeds to process the funds transfer by debiting an account of the Purchaser, and credits an account associated with the Seller. A confirmation message is sent to the Seller, confirming the amount of the funds transferred, and a corresponding message is sent to the Purchaser identifying the items that have been paid for and the total. The indication to both the Purchaser and the Seller that the funds have been transferred signifies that the Seller can physically transfer the goods to the Purchaser, and that the transaction is completed.

The Purchaser may have paid for the items in real time from a pre-paid account, or may pay for the goods as billed by the service provider on a post-paid basis. Alternatively, the Purchaser may pay a third party financial provider for the Purchaser. The Purchaser and Seller have transacted a secure, easy, and electronic purchase transaction without requiring any wireless transfer of sensitive financial information.

That which is claimed:

1. A method to process communication associated with a transaction server comprising a processor, said communication involving a first mobile phone and a second mobile phone, said method comprising:

receiving a first message at said transaction server, said first message received from said first mobile phone and requesting said purchase transaction;

determining a purchaser transaction identifier at said transaction server to be associated with said purchase transaction;

providing said purchaser transaction identifier from said transaction server addressed to said first mobile phone in a second message using a message format such that said first mobile phone displays said purchaser transaction identifier;

receiving a third message at the transaction server, said third message originating from said second mobile phone, said third message comprising said purchaser transaction identifier;

generating a seller transaction identifier to be associated with said purchase transaction;

providing said seller transaction identifier from said transaction server addressed to said second mobile phone in a fourth message using said message format such that said second mobile phone displays said seller transaction identifier;

receiving a fifth message at the transaction server from said first mobile phone, said fifth message indicating authorization to proceed with said purchase transaction, wherein said fifth message is received within a defined timeframe;

in response to determining that said fifth message is not received within said defined timeframe, terminating, by the transaction server, said purchase transaction;

receiving a sixth message at the transaction server from said second mobile phone, said sixth message comprising data identifying an item and a first amount of the item;

receiving a seventh message at the transaction server from said first mobile phone indicating said transaction server to proceed with processing said purchase transaction; and providing a first confirmation message to said first mobile phone and a second confirmation message to said second mobile phone.

2. The method of claim 1 wherein prior to providing said first confirmation message and said second confirmation message, said purchase transaction server causes a first account associated with said first mobile phone to be credited and a second account associated with said second mobile phone to be debited.

3. The method of claim 2 wherein the first confirmation message and the second confirmation message are GSM short message service (SMS) messages.

4. The method of claim 1 wherein the purchase transaction server provides to the first mobile phone said data identifying the item and the first amount of the item.

5. The method of claim 4 further comprising the steps of:
said purchase transaction server retrieving a password associated with the first mobile phone;
said purchase transaction server transmitting a prompting message to the first mobile phone, said prompting message requesting a password; and
said purchase transaction server receiving a response to said prompting message, said response comprising said password.

6. The method of claim 1 wherein the sixth message further comprises a quantity field indicating a quantity of the item and a second amount reflecting a sub-total equal to the quantity of the item multiplied by the first amount of the item.

7. The method of claim 1 wherein the purchase transaction server maintains a transaction log and records said data identifying said item, said first amount of the item, and a total amount.

8. The method of claim 1 wherein the first confirmation message comprises text describing said item and data indicating a total of said transaction.

9. The method of claim 1 wherein the purchase transaction server interfaces with a short message service center (SMSC) associated with one or more wireless service providers.

10. A computing system for processing messages from mobile phone, said computing system comprising:

a processor executing a computer program configured to perform the steps of:
receiving a first message at said purchase transaction server, said first message received from said first mobile phone and requesting said purchase transaction,
determining a purchaser transaction identifier at said purchase transaction server to be associated with said purchase transaction,
providing said purchaser transaction identifier from said transaction server addressed to said first mobile phone in a second message using a message format such that said first mobile phone displays said purchaser transaction identifier,
receiving a third message at the purchase transaction server, said third message originating from said second mobile phone, said third message comprising said purchaser transaction identifier,
generating a seller transaction identifier to be associated with said purchase transaction,
providing said seller transaction identifier from said transaction server addressed to said second mobile phone in a fourth message using said message format such that said second mobile phone displays said seller transaction identifier,
receiving a fifth message at the purchase transaction server from said first mobile phone, said fifth message indicating authorization to proceed with said purchase transaction, wherein said fifth message is received within a defined timeframe,
in response to determining that said fifth massage is not received within said defined timeframe, terminating, by said transaction server, said purchase transaction,
receiving a sixth message at the transaction server from said second mobile phone, said sixth message comprising data identifying an item and a first amount of the item,
receiving a seventh message at the transaction server from said first mobile phone indicating said transaction server to proceed with processing said purchase transaction, and
providing a first confirmation message to said first mobile phone and a second confirmation message to said second mobile phone;
a memory configured to store computer executable instructions for generating said purchaser transaction identifier and said seller transaction identifier; and
an interface for receiving said messages from said mobile phones.

11. The system of claim 10 further comprising:
a database storing a user password, and wherein said processor is further configured to:
prompt the first mobile phone for a password,
receive said password from said first mobile phone,
compare said password with said user password, and
determine said password equals said user password.

12. The system of claim 11 wherein the interface receives said messages from a SMS center associated with a Mobile Telephone Switching Office (MTSO) providing service to said first mobile phone and wherein said messages are GSM short message service messages.

13. The system of claim 12 wherein the processor is further configured to:
provide a seller transaction identifier to the second mobile phone; and
receive said seller transaction identifier from said first mobile phone.

14. The system of claim 10 wherein said processor is further configured to:
- credit a first account associated with said first mobile phone, and
- debit a second account associated with said second mobile phone to be debited.

15. The system of claim 10 further comprising:
- a database storing a transaction log which comprises said data identifying said item, said first amount of the item, and a total amount.

16. The system of claim 10 wherein said processor is further configured to start a timer upon determining a purchaser transaction identifier at said purchase transaction server to be associated with said purchase transaction.

17. A non-transitory computer readable medium storing instructions causing a processor to perform the steps of:
- determine that a first message received at said processor requests from a first mobile phone requests a purchase transaction;
- determine a purchaser transaction identifier to be associated with said purchase transaction,
- provide said purchaser transaction identifier from said processor to an interface addressed to said first mobile phone in a second message using a message format such that said first mobile phone displays said purchaser transaction identifier,
- receive a third message at the processor, said third message originating from said second mobile phone, wherein said third message comprises said purchaser transaction identifier,
- generate a seller transaction identifier to be associated with said purchase transaction,
- provide said seller transaction identifier from said processor to said interface addresses to said second mobile phone in a fourth message using said message format such that said second mobile phone displays said seller transaction identifier,
- receive a fifth message at the processor from said first mobile phone, said fifth message indicating authorization to proceed with said purchase transaction, wherein said fifth massage is received within a defined timeframe,
- terminate said purchase transaction, responsive to determining that said fifth massage is not received within said defined timeframe,
- receive a sixth message at the processor from said second mobile phone, said sixth message comprising data identifying an item and a first amount of the item,
- receive a seventh message at the processor from said first mobile phone indicating said transaction server to proceed with processing said purchase transaction, and
- provide a first confirmation message to said interface addressed to said first mobile phone and a second confirmation message to said interface addressed to said second mobile phone.

18. The non-transitory computer readable medium of claim 17 further comprising the following step:
- receive an acceptance message from said first mobile phone, said acceptance message comprising said seller transaction identifier.

19. The non-transitory computer readable medium of claim 17 further comprising the steps of:
- transmit a prompting message to said first mobile phone, wherein said prompting messages requests a password value to be entered; and
- receive a response from said first mobile phone, wherein said response message comprises a password.

20. The non-transitory computer readable medium of claim 17 further comprising the steps of:
- causing an account associated with said first mobile phone to be modified by an amount equal to a transaction total; and
- causing a second account associated with said second mobile phone to be modified by said amount equal to said transaction total.

* * * * *

UNITED STATES PATENT AND TRADEMARK OFFICE
CERTIFICATE OF CORRECTION

PATENT NO.         : 8,200,260 B2
APPLICATION NO.    : 12/539192
DATED              : June 12, 2012
INVENTOR(S)        : Rouse et al.

It is certified that error appears in the above-identified patent and that said Letters Patent is hereby corrected as shown below:

In Column 1, Line 33, delete "phonese" and insert -- phones --, therefor.

In Column 2, Line 22, delete "3." and insert -- 3 --, therefor.

In Column 5, Line 17, delete "cancelled" and insert -- cancelled. --, therefor.

In Column 7, Line 5, delete "joint" and insert -- join --, therefor.

In Column 8, Line 40, delete "("MTSO)" and insert -- ("MTSO") --, therefor.

In Column 9, Line 35, delete "joint" and insert -- join --, therefor.

In Column 9, Line 47, delete "is step" and insert -- in step --, therefor.

In Column 10, Line 52, delete "Purchasers" and insert -- Purchasers. --, therefor.

Signed and Sealed this
Eighteenth Day of September, 2012

David J. Kappos
*Director of the United States Patent and Trademark Office*